UNITED STATES PATENT OFFICE.

JULIUS ULLRICH, OF RADEBEUL, NEAR DRESDEN, GERMANY.

LIME COLOR.

No. 847,530.      Specification of Letters Patent.      Patented March 19, 1907.

Application filed January 26, 1906. Serial No. 297,982.

*To all whom it may concern:*

Be it known that I, JULIUS ULLRICH, a subject of the King of Saxony, and residing at Radebeul, near Dresden, Germany, have invented certain new and useful Improvements in Lime Color, of which the following is a specification.

The object of the present invention is to produce a lime color which is fast and able to withstand the weather like oil color; and this object is reached by the following mixture: One hundred and eighty grains crude nitric acid of 32° Baumé, or crude sulfuric acid of 42.6 per cent., or eighty grains ninety-six-per cent. sulfuric acid (65°–66° Baumé) are poured into two hundred and fifty grains human feces, as urine, and the human excrements mixed up together as it is by nature, containing solid matter, and filtered while stirring, and to the filtrate seventy grains crude glycerin are added. One hundred grains of this acid liquid are mixed with about one hundred and twenty grains of caustic lime (a good white lime which has been powdered and sifted) and stirred to a thick pap and finally ground with an ordinary color-mill. The so-obtained thick lime pap is then, each time it is used, thinned with water till convenient for painting, and for about one hundred grains color-pap 30–35 grains of water are necessary. By the presence of the lime in the mixture of nitric and sulfuric acids, filtered manure, and glycerin calcium nitrate or calcium sulfate is formed, which with the sulfates of the manure form calcium sulfate, (gypsum,) and also the albuminous particles of the manure combine with lime. By this means a hard mass is formed. The addition of glycerin gives the color the necessary fluidity and prevents premature drying. This color mixture can also be toned down as wished with lime pure bright colors and can be applied as any other color, with a brush on whitewash, stone, cement, wood, &c. It hardens more and more in the air and is very durable. It can also be used instead of oil color for out and in side coats, in which case each coating does away with possible molding, peeling, and stoppage of the necessary air circulation—the disadvantages of oil color.

What I claim is—

The method of preparing a fast lime color consisting in adding acid to two hundred and fifty grains of human feces, as urine and human excrement mixed up together as it is by nature and containing solid matter, filtering, while stirring, adding to the filtrate seventy grains of crude glycerin and to each one hundred grains of this acid liquid adding one hundred and twenty grains of lime.

In testimony whereof I have hereunto set my hand in presence of two subscribing witnesses.

JULIUS ULLRICH.

Witnesses:
     PAUL E. SCHILLING,
     OTTO VOGEL.